United States Patent [19]

Rademachers et al.

[11] 4,355,006
[45] Oct. 19, 1982

[54] PROCESS FOR THE OXIDATIVE DISSOCIATION OF CHROME-CONTAINING ORES

[75] Inventors: Jakob Rademachers, Krefeld; Ingo Pflugmacher, Meerbusch, both of Fed. Rep. of Germany

[73] Assignee: Bayer Aktiengesellschaft, Leverkusen, Fed. Rep. of Germany

[21] Appl. No.: 181,551

[22] Filed: Aug. 27, 1980

[30] Foreign Application Priority Data

Sep. 4, 1979 [DE] Fed. Rep. of Germany ....... 2935718

[51] Int. Cl.$^3$ .............................................. C01G 37/14
[52] U.S. Cl. ........................................ 423/61; 423/53; 75/3; 23/313 R
[58] Field of Search .................. 423/53, 61; 75/3; 23/313 R

[56] References Cited

U.S. PATENT DOCUMENTS

| | | | |
|---|---|---|---|
| 1,948,143 | 2/1934 | Tarr | 423/61 |
| 2,394,793 | 2/1946 | Maier | 75/3 |
| 3,095,266 | 6/1963 | Lauder et al. | 423/61 |
| 3,816,094 | 6/1974 | Low et al. | 423/61 |
| 3,816,095 | 6/1974 | Bruen et al. | 423/61 |
| 4,244,925 | 1/1981 | Subbanna et al. | 423/61 |

FOREIGN PATENT DOCUMENTS 507362 6/1939 United Kingdom .................. 423/61

Primary Examiner—Herbert T. Carter
Attorney, Agent, or Firm—Sprung, Horn, Kramer & Woods

[57] ABSTRACT

A process for the oxidative dissociation of chrome-containing ores comprising agglomerating a mixture of a chrome-containing ore, an alkaline substance and a moist solid residue from a preceding operation as a leaning agent, dissociating the agglomerate and then leaching to form a solution of chromate and a solid residue, and separating said solution from said solid residue still wet with said solution. Advantageously the alkaline substance comprises sodium hydroxide or sodium carbonate, the still wet residue is added in such a quantity that the agglomerates obtained have a moisture content of between about 10 and 15% by weight, and at least about 70% by weight of the agglomerates have a diameter from about 0.1 to 3 mm.

4 Claims, No Drawings

PROCESS FOR THE OXIDATIVE DISSOCIATION OF CHROME-CONTAINING ORES

This invention relates to a process for the oxidative dissociation of chrome ores in which the mixture to be dissociated is used in the form of an agglomerate.

Normally, chrome ore is oxidatively dissociated with alkalis, for example, sodium hydroxide or sodium carbonate, at temperatures of the order of 1000° C. At these temperatures, the mixture to be dissociated almost always sticks to the walls of the rotary kiln used because of its composition, even when significant amounts of leaning agents are added to it.

Processes are already known in which this sticking phenomenon is avoided by the use of a granulated dissociation mixture. Thus, German Auslegeschrift No. 1,016,940 describes a process in which moldings which have been obtained by pressureless forming and which are porous or become porous during the reaction are used for dissociation. In addition, German Offenlegungsschrift No. 2,426,915 describes a process for the production of sodium chromate by pelletizing a mixture of chromite ore and sodium carbonate using an aqueous pelletizing liquid.

The present invention provides a process for the oxidative dissociation of chrome-containing ores by agglomerating a mixture of chrome-containing ores, alkaline substances and leaning agents, dissociating and subsequently leaching this mixture, characterized in that moist return ore is mixed with finely divided chrome ore and alkaline substances, the resulting mixture is agglomerated, optionally dried and then subjected to oxidative dissociation.

In the process according to the invention, the finely divided, preferably crushed ore to be dissociated is mixed with alkaline substances, preferably sodium hydroxide and/or sodium carbonate and still moist so-called return ore, the resulting mixture is agglomerated, optionally dried and then subjected to oxidative dissociation, preferably using air as the oxidizing agent. The moist return ore used is dissociated material from one or more preceding dissociation treatments which is leached and optionally washed. The leaching residues used contain from about 15 to about 25% by weight of water, depending on the dissociation conditions.

The advantage of the process according to the invention lies in the use of agglomerates which are obtained without the otherwise necessary expense of conversion into granules or pellets. In addition, there is no need in the process according to the invention to use granulating plates or forming machines or to apply more energy for evaporating the water serving as granulating liquid. In an installation for the production of chromate or bichromate, the return ore filtered off from the chromate-containing liquor and optionally washed is normally dried. According to the invention, this drying step is, if required, only completed after the starting materials have been mixed, thus saving an energy-intensive drying stage by comparison with conventional processes. The crumbly mixture obtained by the process according to the invention may be directly introduced into the dissociation furnace or may even be stored in an intermediate stage after the then necessary drying operation. The agglomerates are strong enough to be conveyed or stored in bunkers. The strength of the agglomerates, of which about 70% have grain diameters of from 0.1 to about 3 mm, may be further increased by the addition of approximately 25% by weight of sodium hydroxide instead of the soda preferably used.

Simultaneous mixing and granulation are carried out in the machines normally used, most effectively in fixed, horizontally arranged drums with rotating mixing tools. This operation may be carried out either continuously or in batches. The moisture content of the agglomerates obtained is preferably adjusted in such a way that it amounts to between about 5 and 20% by weight and preferably to between about 10 and 15% by weight. However, this moisture content is adjusted solely through the quantity and moisture content of the return ore; no additional water is added. Drying of the agglomerates, which are comparable with an earth-damp friable material, may be carried out in a dryer or in the dissociation furnace itself.

Accordingly, it is possible by virtue of the process according to the invention advantageously to reduce the otherwise necessary energy demand, to avoid undesirable disintegration of the dissociation mixture, for example during intermediate storage in bunkers, and to obtain improved dissociation conditions in the furnace by virtue of the agglomerates.

The process according to the invention is illustrated by the following examples:

EXAMPLE 1

100 parts by weight of a finely ground chrome ore containing 44.5% by weight of $Cr_2O_3$ were continuously mixed in a horizontally arranged mixer comprising mixing tools rotating at high speed with 230 parts by weight of a residue emanating from a preceding dissociation treatment which had been filtered and washed after the leaching stage (water content 22% by weight, $Cr_2O_3$ content approximately 8% by weight) and with 70 parts by weight of soda containing approximately 94% by weight of $Na_2CO_3$ (corresponding to an alkali content of the order of 105% of the stoichiometrically necessary quantity, based on the $Cr_2O_3$ in the fine ore). 400 parts by weight of a crumbly, earth-damp mixture containing 12.7% by weight of water are obtained. After drying in a revolving tube at around 100° to 150° C., 355 parts by weight of agglomerated mixture containing approximately 18% by weight of $Cr_2O_3$ were obtained.

The agglomerates, which had a grain size distribution by weight of 10% below 0.1 mm, 70% from 0.1 to 3 mm and 20% above 3 mm, were continuously delivered via an intermediate bunker to a rotary kiln in countercurrent to the firing gases. The average residence time was about 3 hours. The dissociation temperature was kept at 1030° C. to 1080° C.

The inner walls of the rotary kiln remained completely free from caked deposits. A dissociated material in the same agglomerated form having a water-soluble chromate content of approximately 26% by weight, expressed as $Na_2Cr_2O_7.2H_2O$, was removed from the furnace.

The dissociated material passed while still hot into a wet tube mill in which it was simultaneously leached. The residual material was then separated from the leach in drum filters. After the filter cake had been washed, a still moist return ore was obtained, some of which was re-used as leaning agent in the following dissociation reaction. By virtue of the improved dissociation, this return ore contained less $Cr_2O_3$ than the return ore originally used.

The degree of dissociation amounted to around 90%, based on $Cr_2O_3$ in the chrome ore used.

EXAMPLE 2

100 parts by weight of a finely ground chrome ore having the same composition as in the preceding Example were continuously mixed in a drum mixer comprising rotating mixting tools with 188 parts by weight of a washed return ore from a preceding dissociation treatment which contained 20% by weight of water and 8% by weight of $Cr_2O_3$, with 68 parts by weight of soda containing 94% by weight of $Na_2CO_3$ and with 39 parts by weight of a 50% by weight sodium hydroxide solution (corresponding to a total alkali content of 137% of the stoichiometrically necessary quantity, based on the $Cr_2O_3$ in the fresh ore used, and 100%, based on the total $Cr_2O_3$).

388 parts by weight of crumbly agglomerates containing 14% by weight of water and approximately 15.5% by weight of $Cr_2O_3$ were obtained. After drying, approximately 340 parts by weight of agglomerates containing approximately 17.5% by weight of $Cr_2O_3$ were obtained. After heat treatment in a rotary kiln which was carried out continuously without any caked deposites on the furnace walls, a crumbly dissociated material was obtained with the same grain size distribution. After a residence time of about 3 hours at temperatures of from 1030° to 1100° C., the degree of dissociation amounted to 85%, based on the total $Cr_2O_3$ content of the mixture, or to 113%, based on the $Cr_2O_3$ in the chrome ore used. The material discharged from the furnace had a sodium dichromate content of 31% by weight (expressed as $Na_2Cr_2O_7.2H_2O$).

The figures show that, by virtue of the high alkali content, not only is the $Cr_2O_3$ of the fine ore dissociated without any caked deposits in the furnace, but some more of the $Cr_2O_3$ present in the return ore is also reacted to form soluble chromate.

It will be appreciated that the instant specification and examples are set forth by way of illustration and not limitation, and that various modification and changes may be made without departing from the spirit and scope of the present invention.

What is claimed is:

1. A process for the oxidative dissociation of chrome-containing ores comprising agglomerating a mixture of a chrome-containing ore, an alkaline substance and a moist dissociated leached material containing about 15 to 25% by weight of water from a preceding dissociation operation as a leaning agent, the moist dissociated leached material being added in such a quantity that the agglomerates obtained have a moisture content of between about 5 and 20% by weight, said moisture being obtained solely from the quantity and moisture content of said dissociated leached material, dissociating the agglomerate and then leaching to form a solution of chromate and a solid residue, and separating said solution from said solid residue still wet with said solution.

2. A process as claimed in claim 1, wherein the alkaline substance comprises sodium hydroxide or sodium carbonate.

3. A process as claimed in claim 1, wherein at least about 70% by weight of the agglomerates have a diameter from about 0.1 to 3 mm.

4. A process as claimed in claim 2, wherein the dissociated leached material is added in such a quantity that the agglomerates obtained have a moisture content of between about 10 and 15% by weight, and at least about 70% by weight of the agglomerates have a diameter from about 0.1 to 3 mm.

* * * * *